United States Patent [19]
Tsuchiya et al.

[11] Patent Number: 5,136,472
[45] Date of Patent: Aug. 4, 1992

[54] ELECTRIC DOUBLE LAYER CAPACITOR

[75] Inventors: Yoshinobu Tsuchiya, Fujisawa; Ken Kurabayashi, Chigasaki, both of Japan

[73] Assignee: Isuzu Motors Limited, Shinagawa, Japan

[21] Appl. No.: 550,170

[22] Filed: Jul. 9, 1990

[30] Foreign Application Priority Data

Aug. 22, 1989 [JP] Japan .................................. 215277

[51] Int. Cl.$^5$ .............................................. H01G 9/02
[52] U.S. Cl. .................................... 361/502; 29/25/03
[58] Field of Search ............... 361/303, 304, 305, 323, 361/328, 329, 330, 502; 29/25.42, 25.03

[56] References Cited

U.S. PATENT DOCUMENTS

| | | | |
|---|---|---|---|
| 3,449,171 | 6/1969 | Knight | 136/175 |
| 3,654,533 | 4/1972 | Porta et al. | 361/502 |
| 4,542,444 | 9/1985 | Boland | 361/502 |
| 4,605,989 | 8/1986 | Marse et al. | 361/502 |
| 4,896,249 | 1/1990 | Endo et al. | 361/502 |

*Primary Examiner*—Donald A. Griffin
*Attorney, Agent, or Firm*—Staas & Halsey

[57] ABSTRACT

A pressure ranging from 50 Kgf/cm$^2$ to 800 Kgf/cm$^2$ is applied to a pwoder of fine particles of activated carbon, and while the pressure is being applied to the fine particles, pulse voltages are applied between the fine particles for producing electric discharges between the fine particles, and the fine particles are kept at a temperature ranging from 700° C. to 1000° C., thereby sintering the fine particles of activated carbon into an electrode of a porous sintered body. Two such electrodes are impregnated with an electrolyte to produce polarized electrodes, and a separator is sandwiched between the polarized electrodes, thus completing an electric double layer capacitor.

5 Claims, 6 Drawing Sheets

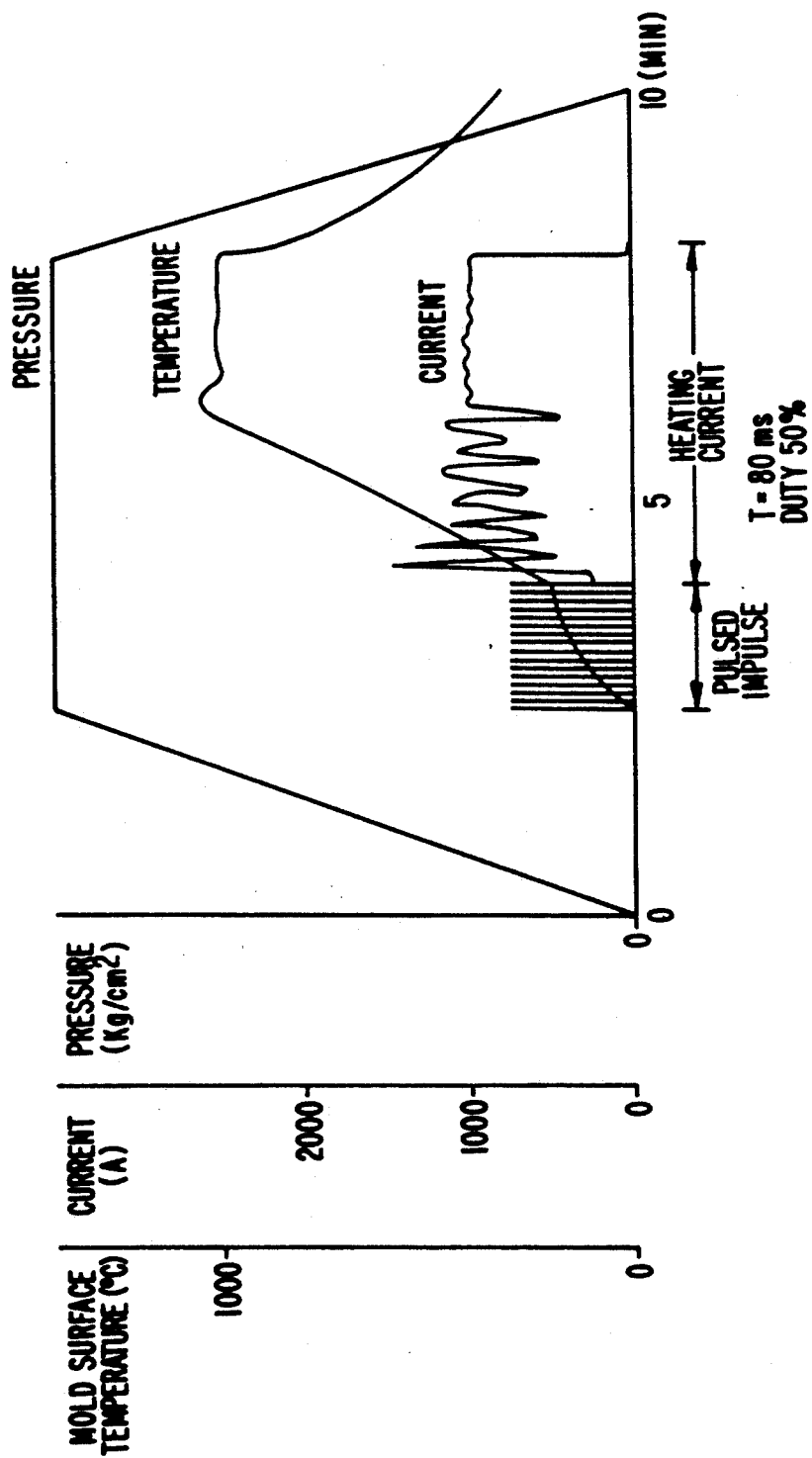

| | CAPACITANCE (F) | SERIES RESISTANCE (Ω) | APPLIED PRESSURE (Kg/cm$^2$) |
|---|---|---|---|
| INVENTIVE EXAMPLE 1 | 32 | 0.19 | 0.625 |
| COMPARATIVE EXAMPLE 1 | 26.5 | 0.30 | 15.0 |

ELECTRIC DOUBLE LAYER CAPACITOR

BACKGROUND OF THE INVENTION

The present invention relates to an electric double layer capacitor of high electrostatic capacitance which utilizes the principles of an electric double layer that is composed of an interface between activated carbon and electrolyte.

Recently, high-capacitance capacitors based on the electric double layer principles have been developed as backup power supplies for memories in electronic systems, and are widely used with microcomputers and IC memories.

One type of electric double layer capacitor is disclosed in U.S. Pat. No. 3,536,936, for example. FIG. 11 of the accompanying drawings shows the structure of the disclosed electric double layer capacitor. The electric double layer capacitor comprises a single basic cell composed of a pair of current collectors 101 of an electron conductor which serves as a pair of collector electrodes, a pair of carbon electrodes 102 made of activated carbon particles, a pair of nonconductive gaskets 103, and an isolating plate 104 positioned between the carbon electrodes 102 for preventing electrons from moving between the electrodes 102. The carbon electrodes 102 are made as paste electrodes from a concentrated slurry which is a mixture of powdery or particulate activated carbon and an electrolyte. The electrolyte has three functions to perform. It serves as a promoter of ion conductivity, an ion source, and a binder for the carbon particles.

It is important that the internal resistance of an electric double layer capacitor be low. The internal resistance of an electric double layer capacitor is greatly affected by the contact resistance of active carbon of the polarized electrodes and the contact resistance between the collector electrodes and the polarized electrodes.

Therefore, in order to reduce the internal resistance of the polarized electrodes and the contact resistance between the collector and polarized electrodes, each basic cell should be kept under vertical pressure to bring the particles of the paste activated carbon into good electric contact with each other. Conventional electric double layer capacitors require each cell to be kept under a pressure of about 100 kg/cm² though it depends on the size of the electrodes, the size of the particles of the carbon material, or the kind of the electrolyte used. In prior electric double layer capacitors, the cells are kept under pressure by deforming the outer cases of the capacitors or bonding the current collectors strongly to gaskets. If an electric double layer capacitor is to be used as a large-capacitance capacitor, e.g., a power supply for energizing a motor, then it is necessary to increase the cross-sectional areas of the electrodes of the basic cell. Therefore, the pressure to be applied to the basic cell has to be increased. Increasing the pressure, however, causes some practical problems such as the selection of means for applying the pressure and the need for high rigidity for the outer cell which houses the basic cell.

SUMMARY OF THE INVENTION

It is an object of the present invention to provide an electric double layer capacitor having an electric double layer composed of an interface between activated carbon and electrolyte, the electric double layer capacitor having a simple construction, a high energy density, and requiring no means for pressurizing electrodes.

Another object of the present invention is to provide a method of easily manufacturing polarized electrodes for use in an electric double layer capacitor.

According to the present invention, there is provided an electric double layer capacitor having an electric double layer composed of an interface between activated carbon and electrolyte, comprising at least two polarized electrodes each comprising a porous sintered body which consists of sintered and joined fine particles of activated carbon, a separator interposed between the polarized electrodes, and a casing in which the polarized electrodes, the separator, and an electrolyte are sealingly accommodated.

According to the present invention, there is also provided an electric double layer capacitor having an electric double layer composed of an interface between activated carbon and electrolyte, comprising at least two polarized electrodes each comprising a porous sintered body which consists of sintered and joined fine particles of activated carbon, the polarized electrodes being impregnated with an electrolyte, two current collectors thermally fused to one surface of the polarized electrodes, respectively, the current collectors being made of an electrically conductive material, a separator interposed between the polarized electrodes and impregnated with an electrolyte, and a gasket disposed between the current collectors in surrounding relation to the polarized electrodes and the separator, the gasket being attached to the current collectors.

According to the present invention, there is further provided a method of manufacturing a polarized electrode for an electric double layer capacitor having an electric double layer composed of an interface between activated carbon and electrolyte, the method comprising the steps of applying a pressure ranging from 50 Kgf/cm² to 800 Kgf/cm² to a powder of fine particles of activated carbon placed in a mold, and while the pressure is being applied to the fine particles, applying pulse voltages between the fine particles for producing electric discharges between the fine particles, and keeping the fine particles at a temperature ranging from 700° C. to 1000° C., thereby sintering the fine particles of activated carbon.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a graph showing the pressure applied to fine particles of activated carbon, the average current flowing through the fine particles, and the temperature of the fine particles, as they change with time;

DETAILED DESCRIPTION OF THE PREFERRED EMBODIMENTS

Figure 1:
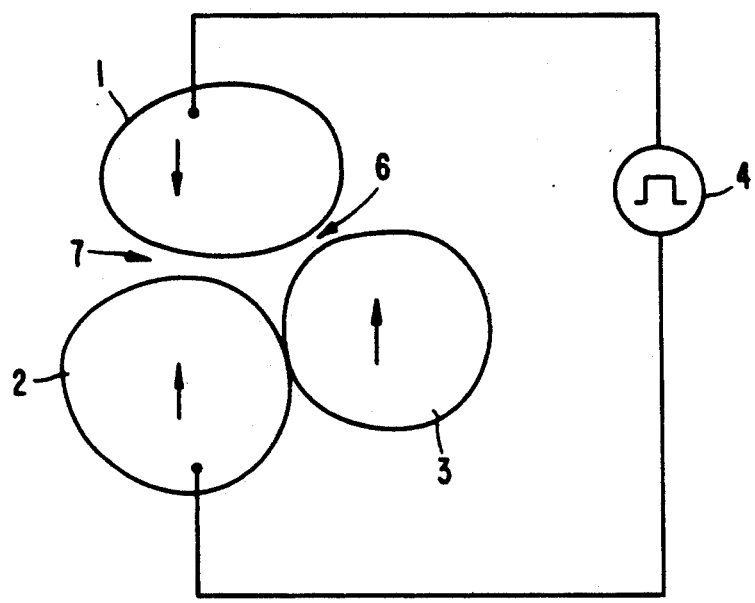
FIG 1 is a diagram showing a model for manufacturing a porous sintered body which constitutes a polarized electrode in an electric double layer capacitor according to the present invention.

FIG. 1 schematically shows a model for manufacturing a polarized electrode for use in an electric double layer capacitor according to the present invention. In FIG. 1, the reference numeral 1 denotes a fine particle of activated carbon and the reference numerals 2, 3 also denote fine particles of activated carbon. The fine particle 3 is joined to the fine particle 2. A pulse power supply 4 generates a sharp pulse voltage.

When an instantaneous pulse voltage is applied between the fine particle 1 and the fine particles 2, 3 by the pulse power supply 4, the electric field across gaps 6, 7 between the fine particles is built up in intensity. As the intensity of the electric field exceeds a predetermined voltage, a dielectric breakdown occurs between the fine particle 1 and the fine particles 2, 3, producing a spark discharge across the gaps 6, 7. At this time, electrons emitted from the fine particles 2, 3 and ion bombardment on the fine particle 1 sufficiently purify the surfaces of the fine particles. The spark discharge produces a large pressure between the electrically conductive fine particles, the impulse pressure due to the spark discharge imparts distortion to the fine particles of activated carbon. Joule heat generated by a subsequently flowing current spreads from points where the fine particles are close to each other, making the activated carbon particles plastically deformable easily. Since the pressure is imposed between the fine particle 1 and the fine particles 2, 3 in the directions indicated by the arrows, the particles 1 and 2, 3 are moved toward each other, and brought into contact through small points. Carbon atoms of the particles are therefore efficiently diffused and moved through these points of contact.

First, small plastic deformation takes place on the fine particles, and the fine particles move toward each other until finally they are brought into point-to-point contact with each other. The areas through which the fine particles contact each other are progressively spread. Consequently, more and more fine particles are packed into a space having a unit volume. As the areas through which the fine particles contact each other are spread, the contact resistance therebetween are greatly reduced, and so is the amount of heat generated. Therefore, the contacting regions of the fine particles are cooled, and melted portions thereof are solidified and the fine particles are firmly bonded to each other.

The above process is not continuously carried out at once. More specifically, the duration of a pulse voltage applied between fine particles is very short, and hence the application of a pulse voltage is interrupted while the fine particles are moving toward each other. Therefore, the spark discharge produced across the gaps 6, 7 between the fine particles is also interrupted. The generation of heat is also interrupted, and the temperature near the gaps is not increased until the fine particles collapse, and is kept below the recrystallization temperature at all times. When a next pulse voltage is applied across the gaps 6, 7, the above action occurs again. The discharge of the above nature is repeated until the fine particles 1 and 2, 3 are brought into contact and bonded to each other. The repeated application of pulse voltages causes the fine particles to be sufficiently joined to each other, resulting in a porous sintered body which is composed of only activated carbon.

FIG. 2 illustrates the pressure applied to fine particles of activated carbon, the average current flowing through the fine particles, and the temperature of the fine particles, as they change with time.

If only a DC voltage were applied between fine particles of activated carbon, the spark discharge would continue for a long period of time until the fine particles are brought into contact with each other, and the spark discharge would develop into an arc discharge, with the result that the temperature in the vicinity of the gaps 6, 7 would rise to the degree that the fine particles would be melted entirely. Therefore, the fine particles would be melted and collapse away into a large mass of carbon, and no porous sintered body would be formed.

Figure 3:
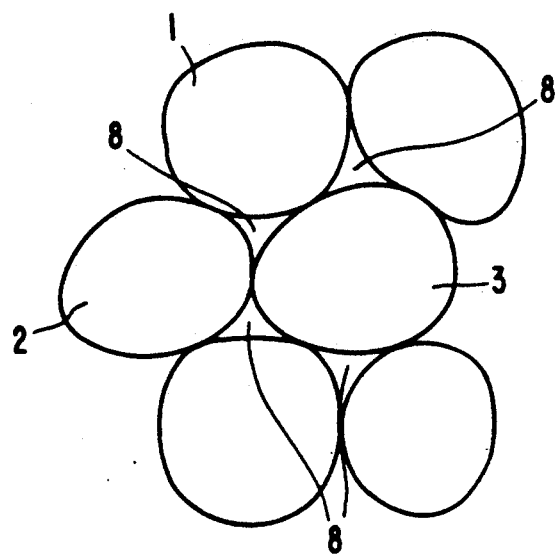
FIG. 3 is a cross-sectional view of a porous sintered body which is formed by a process according to the present invention.

FIG. 3 cross-sectionally shows a porous sintered body which has been formed by the above sequence. As shown in FIG. 3, the fine particles including the fine particles 1, 2, 3 are firmly bonded to each other, with gaps 8 being reliably formed between the fined particles.

Figure 4:
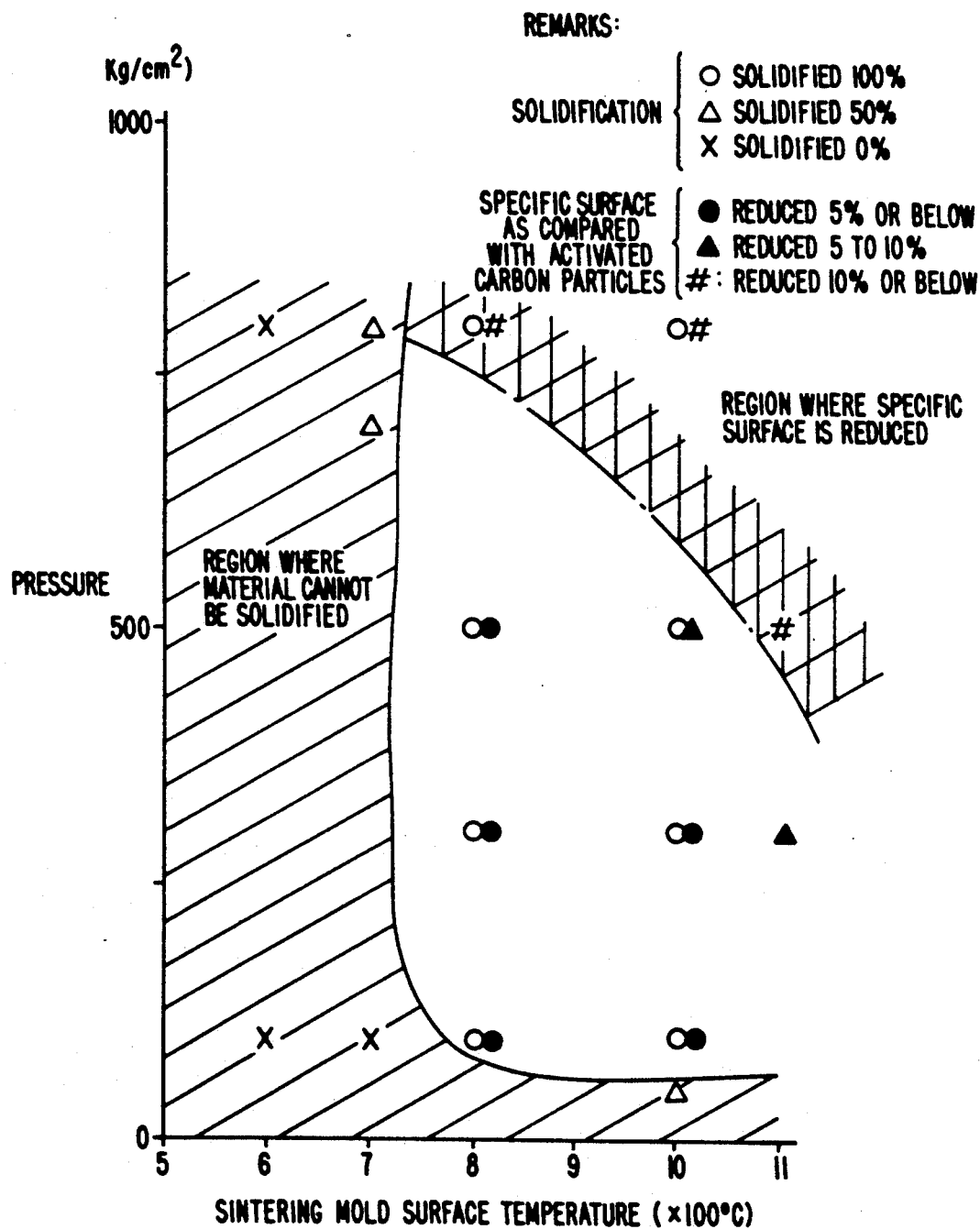
FIG. 4 is a diagram illustrating a region in which fine particles of activated carbon can be sintered into a porous body.

FIG. 4 shows a region in which fine particles of activated carbon can be sintered into a porous body. As illustrated in FIG. 4, the fine particles of activated carbon are not sintered into a porous body if the surface temperature of a sintering mold, i.e., the temperature of the fine particles of activated carbon while they are being sintered under compression, is 700° C. or below. A porous sintered body is formed when the fine particles of activated carbon are pressurized under a pressure ranging from 50 Kgf/cm$^2$ to 800 Kgf/cm$^2$ and the temperature of the fine particles of activated carbon while being sintered under compression is 1000° C. or lower.

In the other region than the above region, the gaps or interstices in the porous body of activated carbon particles would be greatly reduced, and the porous body would not be practically usable.

Figure 5:
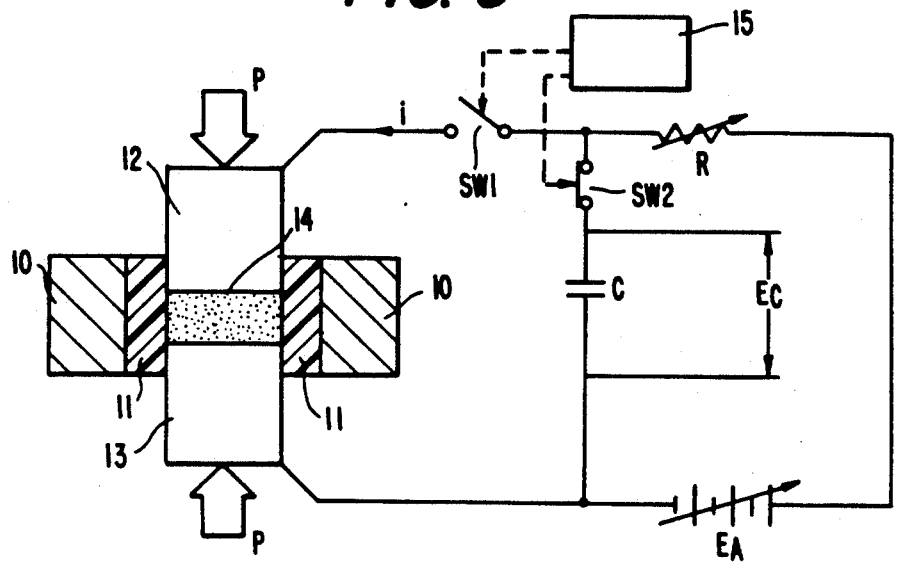
FIG. 5 is a circuit diagram showing an apparatus for manufacturing a porous sintered body according to the present invention.
Figure 6:
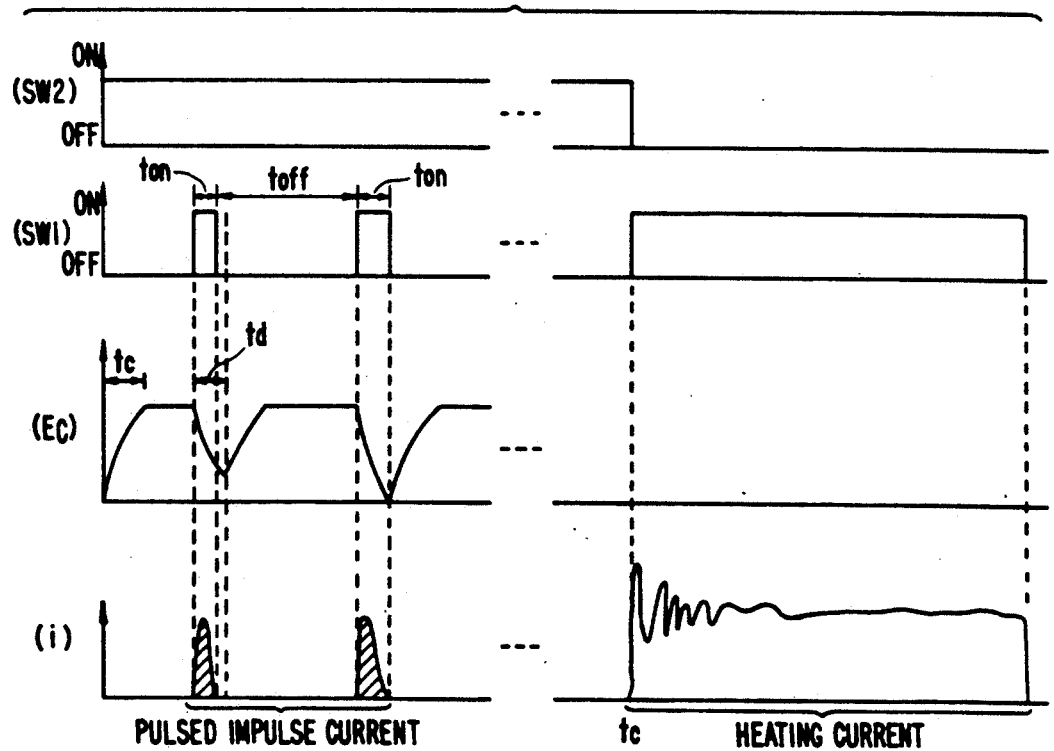
FIG. 6 is a timing chart showing a discharged condition.

FIG. 5 schematically shows an apparatus for manufacturing a polarized electrode of a porous sintered body for use in the electric double layer capacitor according to the present invention. Powder of fine particles of activated carbon is placed in a sintering mold 10. The sintering mold 10 is made of a highly strong metal such as tungsten steel, and has a central hole for placing activated carbon particles therein. The inner wall of the hole is coated with an insulating material such as silicon oxide ($SiO_2$) or silicon nitride ($Si_3N_4$) by a known process such as vapor growth, thus forming an insulating layer 11. Upper and lower electrodes 12, 13 have lower and upper ends, respectively, inserted in the hole in the sintering mold 10. The upper and lower electrodes 12, 13 are made of a heat-resistant metal such as tungsten, molybdenum, or the like. Fine particles 14 of activated carbon are sealed between the upper and lower electrodes 12, 13. Although not shown in FIG. 5, the upper and lower electrodes 12, 13 are controllably pressed by a hydraulic pressure in the directions indicated by the arrows so that a desired pressure can be applied to the fine particles 14. The fine particles 14 and the sintering mold 10 are placed in a desired atmosphere. The upper and lower electrodes 12, 13 are electrically connected to a series-connected circuit of switches SW1, SW2 and a capacitor C, and a series-connected circuit of a variable resistor R and a variable-voltage power supply EA is connected parallel to a series-connected circuit of the capacitor C and the switch SW2. The on- and off-times of the switches SW1, SW2 are controlled by a switch control circuit 15. The switch SW1 comprises a normally open switch, and the switch SW2 comprises a normally closed switch.

The sintering mold 10 may be made of a ceramic material such as silicon oxide ($SiO_2$), silicon nitride ($Si_3N_4$), silicon carbide (SiC), or the like.

Operation of the apparatus shown in FIG. 5 will be described below.

While no voltage is being applied between the upper and lower electrodes 12, 13, the upper and lower electrodes 12, 13 are driven toward each other to progressively increase the pressure applied to the fine particles 14 placed therebetween.

In the condition shown in FIG. 5, the capacitor C is sufficiently charged. When the pressure applied to the fine particles 14 has reached a predetermined level, the switch SW1 is controlled so as to be repeatedly turned on and off. A voltage Ec is applied across the capacitor C.

The on-time $t_{on}$ of the switch SW1 is controlled so that it is equal to or shorter than a discharge time $t_d$ in which the charges in the capacitor C are discharged between the upper and lower electrodes 12, 13. The off-time of the switch SW1 is controlled so that it is substantially equal to or longer than a charge time $t_c$ in which the capacitor C can be charged. Therefore, a current i flowing between the upper and lower electrodes 12, 13 is rendered variable from a maximum value to a minimum value.

When the switch SW1 is thus repeatedly turned on and off, sharp pulsed impulse currents flow between the upper and lower electrodes 12, 13.

The pulsed impulse current is supplied between the upper and lower electrodes 12, 13 until almost all the fine particles of activated carbon sandwiched between the upper and lower electrodes are brought into contact and fused to each other. Thereafter, while the pressure applied to the fine particles 14 is being kept at a constant level at a time $t_c$, the switch SW2 is continuously turned off and the switch SW1 is continuously turned on, and the resistance of the variable resistor R and the voltage of the variable-voltage power supply EA are regulated to continuously pass a heating current of a given value between the upper and lower electrodes 12, 13.

Since those portions of the fine particles which are not sufficiently held in contact and fused to each other or are unstably fused to each other tend to collapse or the bonded regions of the fine particles tend to be displaced resulting in a local high temperature, in an initial phase of energization with the heating current, the heating current is controlled so that the temperature of the fine particles will rise slowly.

After a target temperature is reached, the heating current which is supplied is kept at a constant level for thereby maintaining the porous sintered body of activated carbon whose temperature has been increased thus far at a constant temperature (see FIG. 2).

Under such a condition, the fine particles of activated carbon which the porous sintered body is made of are stably bonded to each other. Now, the discharged voltage applied between the upper and lower electrodes 12, 13 is turned off, and the pressure applied therebetween is also cut off. When the temperature of the porous sintered body has dropped to normal temperature, the porous sintered body is removed from the sintering mold 10.

INVENTIVE EXAMPLE 1

0.345 g of fine particles of activated carbon which have a specific surface of 1600 $cm^2/g$ was put into a mold, without use of any binder, pressurized under 300 $kg/cm^2$, and an ion impulse current of 750 A and a heating current of 1000 A were supplied for 90 seconds and 120 seconds, respectively, thereby producing a thin disc-shaped porous sintered body of fine carbon particles. The porous sintered body thus formed as a polarized electrode had a diameter of 20 mm and a thickness of 1.5 mm. To check the porosity of the porous sintered body, two disc-shaped polarized electrodes which were produced in the above manner were impregnated with 0.515 g of 30 wt% diluted sulfuric acid as an electrolyte. A separator impregnated with the electrolyte was sandwiched between the polarized electrodes, thereby completing an electric double layer capacitor (Inventive Example 1) which has an electrostatic capacitance of 32 farads.

In order to inspect the structure of the porous sintered bodies produced as polarized electrodes, there was produced according to comparative example an electric double layer capacitor having paste electrodes placed in the same volume as that which would be occupied by the polarized electrodes of the electric double layer capacitor according to Inventive Example 1. It was possible to impregnate one side of the paste electrodes with 0.305 g of carbon particles and 1.04 g of an electrolyte.

Figures 7, 8:
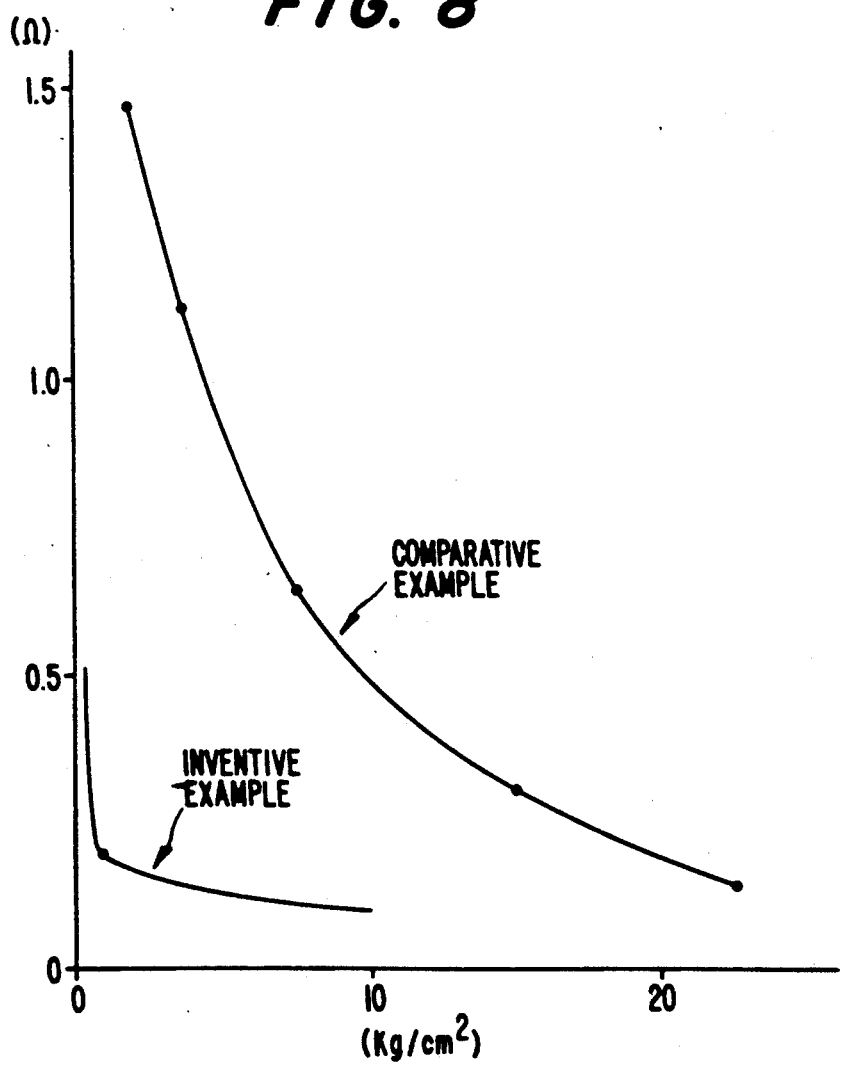
FIG. 7 is a table showing performances of an electric double layer capacitor according to Inventive Example 1 and an electric double layer capacitor according to comparative example.
FIG. 8 is a graph showing the relationship between the pressures applied to the electrodes of the electric double layer capacitors according to Inventive Example 1 and comparative example and the internal resistances of these electric double layer capacitors.

FIG. 7 shows the performances of the electric double layer capacitor according to Inventive Example 1 and the electric double layer capacitor according to comparative example.

As can be understood from the numerical values shown in Table of FIG. 7, the electrostatic capacitance of the electric double layer capacitor according to Inventive Example 1 is 20% higher than that of the electric double layer capacitor according to comparative example. The series resistance of the electric double layer capacitor according to Inventive Example 1 is 37% lower than that of the electric double layer capacitor according to Comparative Example. The pressure applied during use to the polarized electrodes of the electric double layer capacitor according to Inventive Example 1 is one twenty-fourth of that of the electric double layer capacitor according to comparative example.

FIG. 8 is a graph showing the relationship between the pressures applied to the electrodes of the electric double layer capacitors according to Inventive Example 1 and comparative example and the internal resistances of these electric double layer capacitors;

INVENTIVE EXAMPLE 2

The electric double layer capacitor according to Inventive Example 1 is of the same construction as that of the conventional electric double layer capacitor for comparison of the performances. According to Inventive Example 2, however, the collectors and the polarized electrodes were improved in structure since the pressure applied during use to polarized electrodes of the electric double layer capacitor according to the present invention is much smaller as compared with the conventional electric double layer capacitor.

Figure 9:
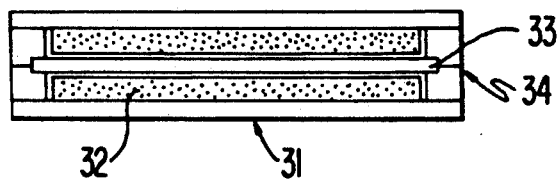
FIG. 9 is a cross-sectional view of an electric double layer capacitor according to Inventive Example 2.

FIG. 9 shows in cross section the electric double layer capacitor according to Inventive Example 2. The electric double layer capacitor had current collectors 31 made of electrically conductive plastic. A porous sintered bodies made of fine particles of activated carbon produced according to the present invention was thermally fused to each of the current collectors 31 and impregnated with an electrolyte, thereby forming polarized electrodes 32. A separator 33 impregnated with an electrolyte was sandwiched between the polarized electrodes 32. In this manner, an electric double layer capacitor cell was fabricated. The electric double layer capacitor cell had gasket 34 made of electrically nonconductive plastic.

The contact resistance between the collectors and the polarized electrodes in the electric double layer capacitor according to Inventive Example 2 was relatively low. Since the collectors and the gasket were made of plastic, the rigidity of the cell was higher than that of the conventional electric double layer capacitor in which the gasket is made of synthetic rubber.

INVENTIVE EXAMPLE 3

Figure 10:
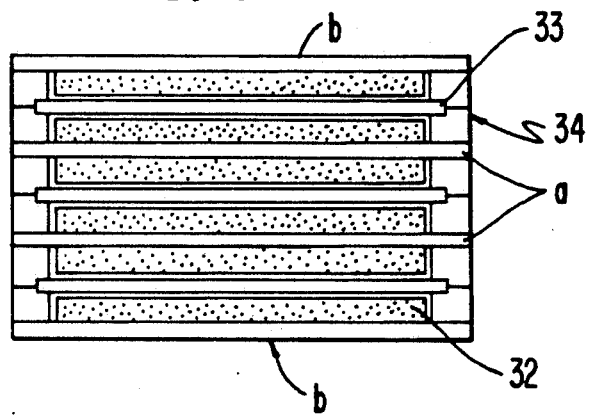
FIG. 10 is a cross-sectional view of a stacked electric double layer capacitor.
Figure 11:
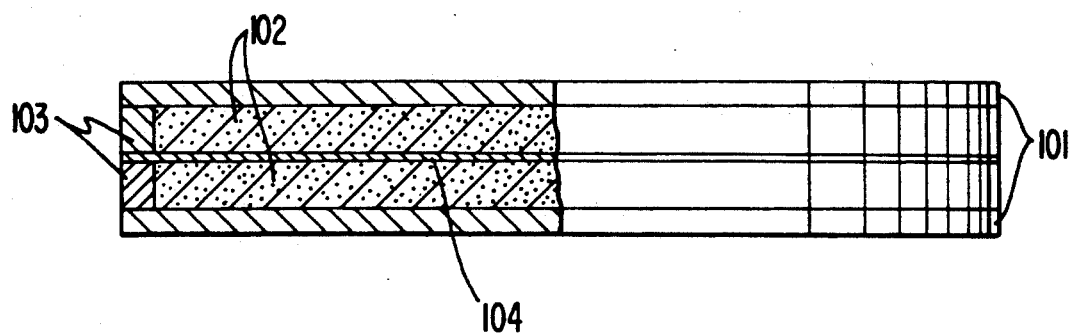
FIG. 11 is a cross-sectional view of a conventional electric double layer capacitor which has paste electrodes of a slurry.

An electric double layer capacitor according to Inventive Example 3 was composed of a stack of electric double layer capacitor cells according to Inventive Example 2. FIG. 10 shows in cross section the stacked electric double layer capacitor according to Inventive Example 3. In Inventive Example 3, porous sintered bodies were thermally fused to both surfaces of each collector a, and a porous sintered body was thermally fused to one surface of each collector b.

Those parts shown in FIG. 10 which are identical to those shown in FIG. 9 are denoted by identical reference numerals, and will not be described in detail.

With the present invention, as described above, porous sintered bodies in which fine particles of activated carbon were sintered and joined together are used as polarized electrodes. It is not necessary to apply a high pressure to the polarized electrodes in an electric double layer capacitor cell, unlike the conventional electric double layer capacitor which employs paste-like polarized electrodes that require to be compressed under a high pressure. Accordingly, the electric double layer capacitor according to the present invention is simple in structure. Since no binder such as metal powder of low melting point, wax, or the like is employed in the polarized electrodes, the steps of mixing the binder and evaporating the binder after sintering are not necessary when the porous sintered body is fabricated. As no binder remains in the porous sintered body, the electric double layer capacitor according to the present invention has better characteristics than the conventional electric double layer capacitor.

Furthermore, the electric double layer capacitor according to the present invention has a greater electrostatic capacitance per unit volume and a lower internal resistance than the conventional electric double layer capacitor.

Although certain preferred embodiments have been shown and described, it should be understood that many changes and modifications may be made therein without departing from the scope of the appended claims.

What is claimed is:

1. An electric double layer capacitor having an electric double layer composed of an interface between activated carbon and electrolyte, comprising:
   at least two polarized electrodes each comprising a porous sintered body which consists of sintered and joined fine particles of activated carbon, said polarized electrodes being impregnated with an electrolyte.
   two current collectors, said current collectors being made of an electrically conductive material;
   a separator interposed between said polarized electrodes and impregnated with an electrolyte;
   said polarized electrodes being thermally fused to both surfaces of each of said current collectors, thereby forming a plurality of assemblies, said assemblies being stacked with said separator sandwiched therebetween; and
   a gasket disposed between said current collectors in surrounding relation to said polarized electrodes and said separator, said gasket being attached to said separator, said gasket being attached to said current collectors.

2. An electric double layer capacitor according to claim 1, wherein said current collectors are made of electrically conductive plastic and are thermally fused to said polarized electrodes.

3. A method of manufacturing a polarized electrode for an electric double layer capacitor having an electric double layer composed of an interface between activated carbon and electrolyte, said method comprising the steps of:
   applying a pressure ranging from 50 Kgf/cm$^2$ to 800 Kgf/cm$^2$ to a powder of fine particles of activated carbon placed in a mold; and
   while said pressure is being applied to the fine particles, applying pulse voltages between the fine particles for producing electric discharges between the fine particles, and keeping the fine particles at a temperature ranging from 700° C. to 1000° C., thereby sintering the fine particles of activated carbon 4. A method according to claim 3, further including the steps of supplying pulse currents to the fine particles and supplying a heating current to the fine particles when the fine particles are sintered.

5. A method according to claim 4, wherein said heating current is higher than said pulse currents and supplied at a lower voltage than the voltage at which said pulse currents are supplied.

* * * * *

UNITED STATES PATENT AND TRADEMARK OFFICE
CERTIFICATE OF CORRECTION

PATENT NO. : 5,136,472
DATED : August 4, 1992
INVENTOR(S) : Yoshinobu Tsuchiya, et al.

It is certified that error appears in the above-identified patent and that said Letters Patent is hereby corrected as shown below:

Title Page, [73] "Shinagawa" should be --Tokyo--;

Title Page, Col. 2, after line 3, insert the following

--FOREIGN PATENT DOCUMENTS 3530772   3/1986   Germany 0212572   3/1987   Europe 3801719   8/1988   Germany 90308781  4/1991   Europe

OTHER PUBLICATIONS

Patent Abstracts of Japan, Vol. 10, No. 32 (E-379), 7th Feb.,

1986; JP-A-60 189 162 (Matsushita Denki Sanyo) 26-09-1985;

Patent Abstracts of Japan, Vo. 12, No. 186 (C-500), 31st May;

UNITED STATES PATENT AND TRADEMARK OFFICE
CERTIFICATE OF CORRECTION

PATENT NO. : 5,136,472
DATED : August 4, 1992
INVENTOR(S) : Yoshinobu Tsuchiya, et al It is certified that error appears in the above-indentified patent and that said Letters Patent is hereby corrected as shown below:

JP-A-62 292 612 (Sumitomo Metal Ind.) 19-12-1987.--

Col. 5, line 36, "SWI" should be --SW1--.

Signed and Sealed this

Twenty-sixth Day of October, 1993

*Attest:*

BRUCE LEHMAN

*Attesting Officer*      Commissioner of Patents and Trademarks